United States Patent
Kehlenbach

(10) Patent No.: US 7,017,421 B2
(45) Date of Patent: Mar. 28, 2006

(54) ACTUATOR AND SENSOR SYSTEM FOR COMPOSITE STRUCTURES

(75) Inventor: Michael Kehlenbach, Taufkirchen (DE)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 10/406,560

(22) Filed: Apr. 4, 2003

(65) Prior Publication Data
US 2003/0219191 A1    Nov. 27, 2003

(30) Foreign Application Priority Data
Apr. 4, 2002    (DE)    ................. 102 14 984

(51) Int. Cl.
*G01L 1/24*    (2006.01)
(52) U.S. Cl. ........................................ 73/800
(58) Field of Classification Search .................. 73/800; 356/345, 35.5, 32, 477; 385/37, 12; 250/227.12, 250/227.14
See application file for complete search history.

(56) References Cited

U.S. PATENT DOCUMENTS

| | | | |
|---|---|---|---|
| 4,922,096 A | 5/1990 | Brennan | |
| 5,338,928 A | 8/1994 | Jamieson et al. | 250/227.21 |
| 5,361,130 A * | 11/1994 | Kersey et al. | 356/478 |
| 5,493,390 A | 2/1996 | Varasi et al. | |
| 5,814,729 A | 9/1998 | Wu et al. | 73/588 |
| 5,818,585 A * | 10/1998 | Davis et al. | 356/345 |
| 5,909,273 A * | 6/1999 | Malvern | 356/35.5 |
| 6,571,639 B1 * | 6/2003 | May et al. | 73/800 |

FOREIGN PATENT DOCUMENTS

| | | |
|---|---|---|
| DE | 198 29 216 | 3/2000 |
| DE | 199 54 020 | 6/2001 |
| WO | 99/58059 | 11/1999 |
| WO | WO 00/02264 | 1/2000 |

OTHER PUBLICATIONS

European Search Report dated Oct. 1, 2003.

* cited by examiner

*Primary Examiner*—Max Noori
*Assistant Examiner*—Octavia Davis
(74) *Attorney, Agent, or Firm*—Crowell & Moring LLP

(57) ABSTRACT

An actuator and sensor system (1) for composite structures, especially carbon-fiber reinforced plastic structures (10) with piezo-ceramic actuators, particularly for active vibration dampening and/or shape control purposes, as well as fiber Bragg grating sensors (30), particularly in the form of strain measurement sensors. The piezo-ceramic actuators are designed as piezo fiber modules (20a, 20b) and the fiber Bragg grating sensors (30) are at least partially embedded in the piezo fiber modules (20a, 20b).

8 Claims, 2 Drawing Sheets

ACTUATOR AND SENSOR SYSTEM FOR COMPOSITE STRUCTURES

BACKGROUND AND SUMMARY OF THE INVENTION

This application claims the priority of German Application No. 102 14 984.4, filed Apr. 4, 2002, the disclosure of which is expressly incorporated by reference herein.

The invention relates to an actuator and sensor system for composite structures, in particular carbon-fiber reinforced plastic structures with piezo-ceramic actuators, especially for active vibration dampening and/or shape control, as well as fiber Bragg grating sensors, particularly as strain measurement sensors.

For the purpose of monitoring the power potential and integrity of fiber composite structures (structural health monitoring) and, in particular, of carbon-fiber reinforced plastic structures, integrated sensors are increasingly gaining importance. Especially in the aerospace industry, the carbon-fiber reinforced plastic structures with embedded fiber Bragg grating sensors offer a very promising approach for both monitoring the integrity of the structure during operation and for achieving a considerable gain with regard to safety and reliability with low inspection and maintenance costs.

Fiber Bragg grating sensors are intrinsic optical sensors, which are not influenced by radio- or microwaves, have excellent multiplexing abilities and exhibit a high long-term stability. Due to the fact that fiber Bragg grating sensors are optical fibers with small diameter, they can be integrated easily into composite structures. The sensors can measure and detect not only strain and tension but also temperatures changes in the structure. This process can take place both in a high-resolution static manner or dynamically at a high sampling rate. In this manner deformations, damage, vibrations as well as elastic waves and ultrasound waves can be detected. The advantages of integrated fiber Bragg grating sensors include low purchase price, low weight and robust features for applications in composite structures.

Similarly piezo-ceramic actuators can serve especially in composite structures as actuators for shape control or active vibration control by having the piezo-ceramic actuators glued onto the structure or laminated into the structure. By applying electric potential, they are triggered and perform a motion that is equivalent to the potential level—usually an expansion. This process can be used to adapt the shape by converting tension arising in the structure by the motion of the piezo-ceramic modules into an actuating motion of the structure, for example, in order to adjust the shape to a certain desired value. When triggering, the piezo-ceramic actuators is modified with regard to time vibrations are created, which can counteract undesirable vibrations in the structure.

For the above-described applications, cuboid or disk-like piezo-ceramic actuators are used as the piezo-ceramic actuators. When integrating cuboid or disk-like piezo-ceramic actuators into the structure, said structure, however, is weakened by the embedded foreign bodies. This occurs mainly due to the fact that the individual carbon fiber layers of the structure are guided around the piezo-ceramic actuators. In particular with composites and especially with carbon-fiber reinforced plastic structures, the cuboid or disk-like piezo-ceramic actuators disrupt the course of the fibers that have been introduced. They run no longer in the direction of the power flow, leading to a weakening of the structure. Additionally, on the boundary surfaces between the structure and the piezo-ceramic actuators, the risk of delamination of the structure due to the formation of resin pockets is particularly high. Bonding with the ceramic is only weak and is additionally frequently impaired by the constant movements of the piezo-ceramic actuators in the structure, causing the defect to further expand throughout the entire structure. This becomes even more critical as the number of piezo-ceramic actuators in the structure increases.

For the purpose of structural monitoring by means of the fiber Bragg grating sensors as the strain measurement system, the structure can be stimulated into vibrations from the exterior with ultrasound. This has the disadvantage that the measuring technology cannot be completely integrated into the structure so that online monitoring during usage of the structure is not possible. However, it is also known that structurally integrated cuboid or disk-like piezo-ceramic actuators can be used for stimulation purposes. In this case, elastic waves (e.g. Lamb waves) are stimulated, which propagate in the structure and due to their propagation characteristic, can be used to evaluate the structural integrity when they are metrologically detected by a sensor such as the fiber Bragg grating sensor. For damage diagnosis, the change in the propagation behavior of the elastic waves before and after the damage is used. However, apart from the above-described disadvantages relating to the integration of cuboid or disk-like piezo-ceramic actuators this has the additional disadvantage that while the laminate can be monitored and controlled, the piezo-ceramic actuators themselves cannot be monitored and controlled. Additionally the measurement resolution is very low in such configurations.

It is an object of the present invention to provide an actuator and sensor system, which can be completely integrated into the structure, which minimizes the risk of damage, especially due to delamination, to the structure and which also enables the function of the integrated actuators to be monitored.

To achieve this goal, an actuator and sensor system of the above-described kind pursuant to the invention is characterized in that the piezo-ceramic actuators are designed as piezo fiber modules and that the fiber Bragg grating sensors are at least partially integrated in the piezo fiber modules.

Piezo fiber modules differ from piezo-ceramic actuators in that the active components are not cuboid or disk-like, but consist of fiber-shaped, piezo-ceramic material. They, however, are expanded or compressed conventionally by applying tension. In order to obtain the most efficient energy yield, a piezo fiber module consists of several piezo-ceramic fibers, which are introduced into the structure and are connected with each other in a circuit.

The piezo-ceramic fibers, which are introduced as the piezo fiber module, assume in the embodiment pursuant to the invention both the function of shape control and active vibration dampening as well as of generating ultrasound waves in order to enable structural monitoring or damage-free examination of the structure with the integrated fiber Bragg grating sensors for strain measurement purposes. The fiber Bragg grating sensors hereby act both statically and dynamically in order to detect deformations, vibrations and propagating ultrasound waves.

It has proven beneficial with such a system that both the piezo fiber modules and the fiber Bragg grating sensors can be embedded in the composite and do not represent impurities in the structure, creating a structure with maximum functionality. The rigidness and stiffness of the structure is reduced considerably less than with cuboid or disk-like piezo-ceramic actuators. The piezo fibers as such also have greater firmness or elongation at rupture than comparable cuboid elements. In addition, greater expansion can be achieved compared to cuboid or disk-like piezo-ceramics so that the piezo fibers can be used even with slightly arched surfaces. Since the structure is influenced very little by the use of piezo-ceramic fibers, the structure also no longer runs the risk of delamination caused by the actuators or sensors. Furthermore, the additional weight from the piezo fiber modules and fiber Bragg grating sensors that have been integrated in the structure is relatively low. This is offset a clear improvement with regard to functionality, offering the opportunity to save weight in other areas. The integrated structural monitoring arrangement allows especially for the use in airplanes or helicopters a reduction in maintenance cost because the condition of the structure can be evaluated at any time. Furthermore, by introducing the fiber Bragg grating sensors into the piezo fiber modules, apart from regular monitoring of the composite structure, it is possible to monitor not only the laminate of the structure, but also the piezo fibers, i.e. the source of the ultrasound waves itself.

As mentioned above, the piezo fiber modules can consists of several piezo-ceramic fibers that have been integrated in the structure and are connected with each other in a circuit. Preferably the piezo fiber modules however are piezo-ceramic fibers that have been embedded in a polymer and are arranged substantially parallel and electrodes that contact and run crosswise to the piezo-ceramic fibers.

This way the modules can be prefabricated outside the structure and can be integrated into the structure afterwards, allowing considerable savings to be achieved with regard to the work that is involved. By embedding them into a polymer, good bonding with the remaining structure is guaranteed without increasing the risk of delamination. Additionally, the pre-fabricated design facilitates contacting that has to be performed later on at the component.

Apart from the fiber Bragg grating sensors, which have been introduced into the piezo fiber modules, additional sensors are preferably also embedded in the composite structure. The use of dispersed fiber Bragg grating sensors offers a greater measurement resolution. Damage can therefore be better identified. In a particularly preferred embodiment, the additional fiber Bragg grating sensors are integrated into the structure such that they form a grid. This further improves the locating of possible damage.

The triggering of the piezo fiber modules for shape control, for active vibration dampening and for generating ultrasound waves can be performed in different ways. A function generator and a signal amplifier preferably trigger the piezo fiber modules. The function generator can be used to perform addressing sequences for shape control or vibration dampening as a function of the requirements as well as addressing of the piezo fiber modules for generating the ultrasound waves of the shape that is required. The signal amplifier raises the output signal of the function generator to the required level, however without directly influencing the addressing sequence itself.

In order to increase variability and application possibilities, it is furthermore particularly beneficial to operate the function generator and the signal amplifier by means of an external control unit and a process computer. With the process computer, in particular, it is easier to coordinate differing addressing sequences for shape control or vibration dampening and for generating ultrasound waves.

For triggering the fiber Bragg grating sensors that are embedded in the piezo fiber modules and the fiber Bragg grating sensors that are possibly additionally integrated in the structure preferably light that has been generated by a laser is coupled into the fiber Bragg grating sensors by means of a first coupler and the reflected signal is read by means of a second coupler and forwarded via a multiplexing unit to the process computer for analysis. This can be the same process computer that already handles the control and triggering of the piezo fiber modules.

Other objects, advantages and novel features of the present invention will become apparent from the following detailed description of the invention when considered in conjunction with the accompanying drawings.

BRIEF DESCRIPTION OF THE DRAWINGS

The following describes the invention more closely based on the embodiments shown in the drawings and reveals further details, features and benefits.

DETAILED DESCRIPTION OF THE PREFERRED EMBODIMENT

Figure 1:
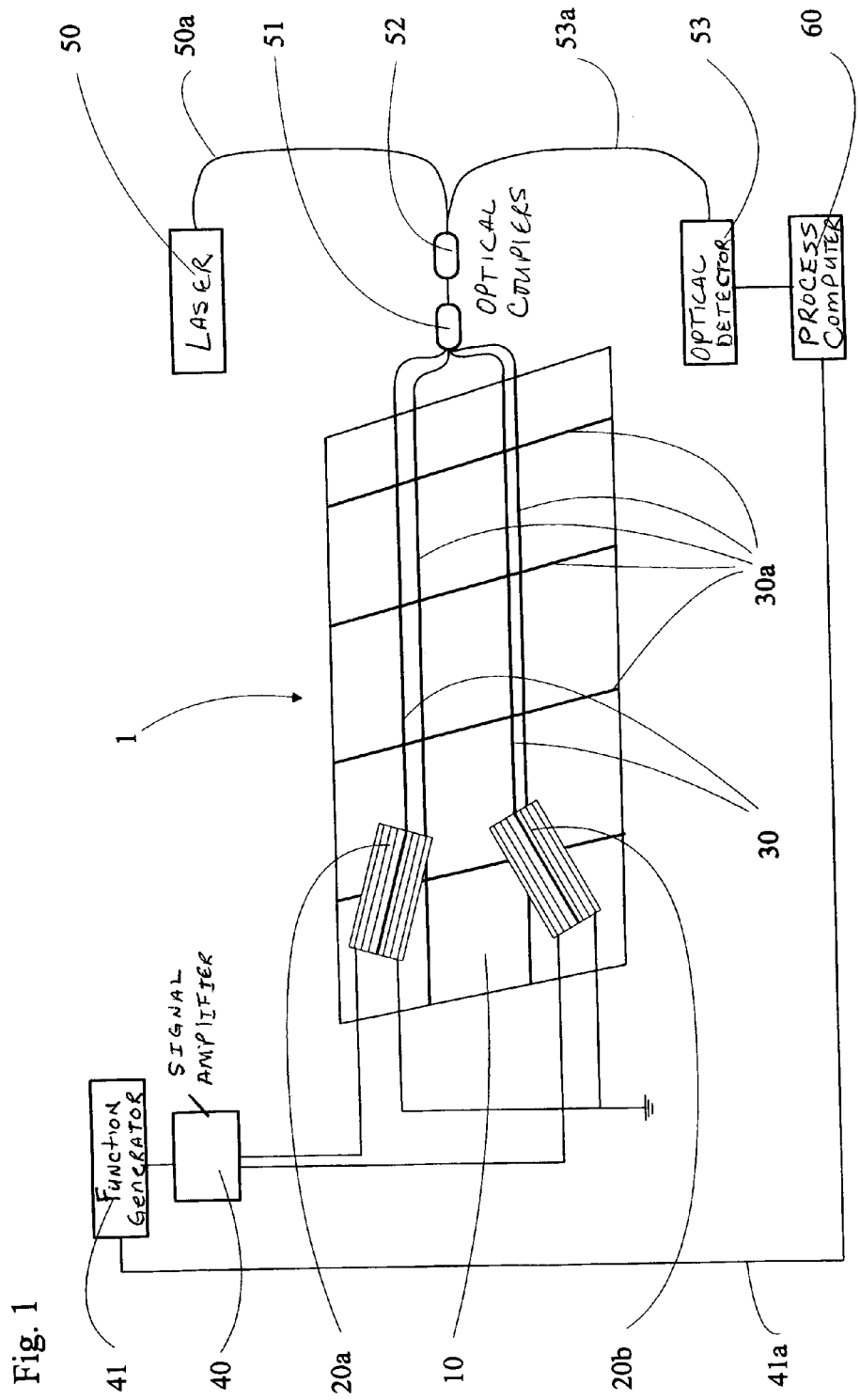
FIG. 1 is a basic design of a system pursuant to the invention based on integration into a rotor blade with carbon-fiber reinforced plastic technology.

FIG. 1 shows the actuator and sensor system 1 of the present invention integrated in a structure 10. This structure 10 is a rotor blade of a helicopter with carbon-fiber reinforced plastic technology. However, other components such as e.g. airplane wing surfaces or the like in other construction designs are also conceivable. For clarification purposes, the parts that are integrated into the structure 10 are depicted in a raised fashion.

Figure 2:
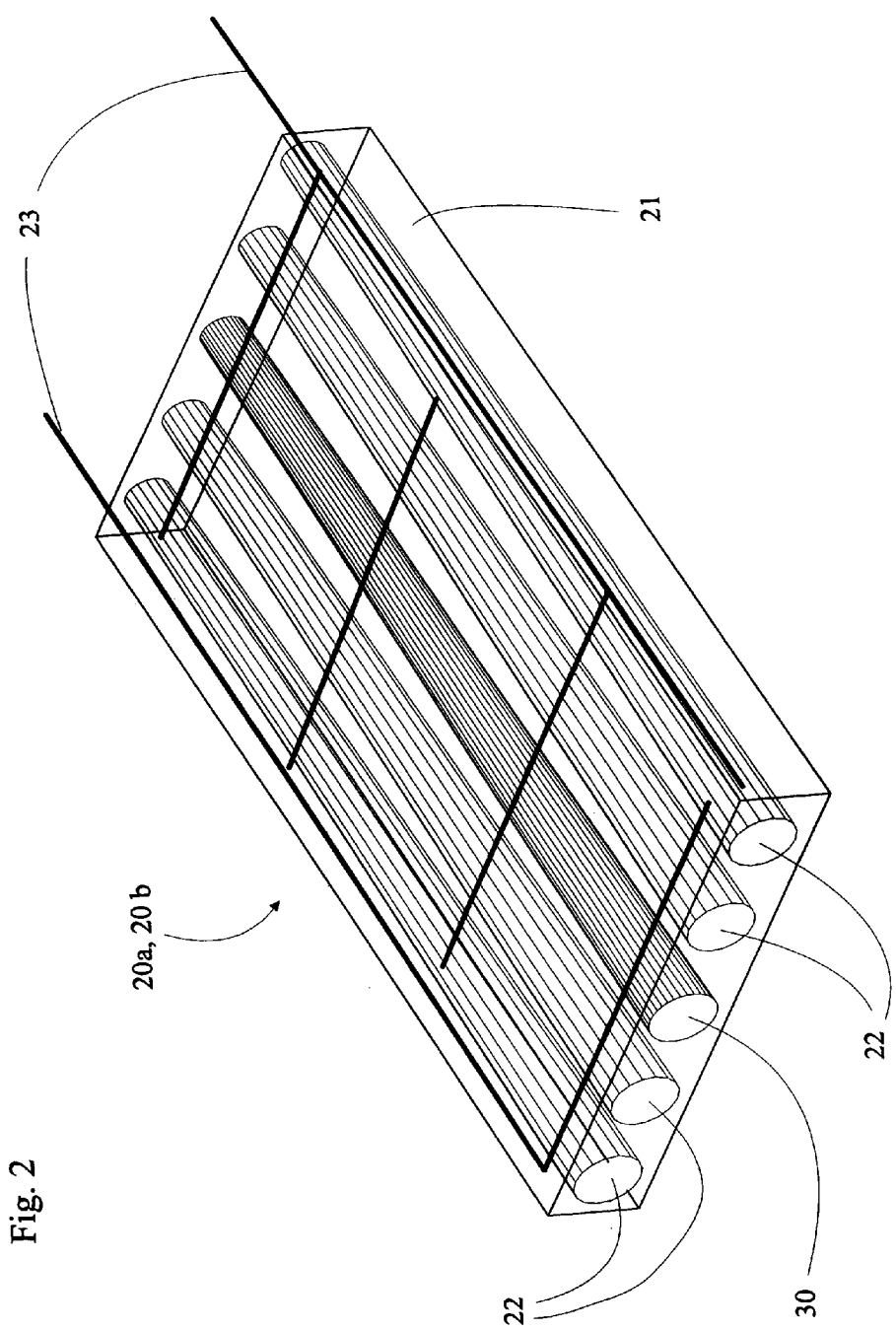
FIG. 2 shows an enlarged view of a piezo fiber module with integrated Bragg fiber grating sensor.

Individual fiber Bragg grating sensors 30 extend into the integrated piezo fiber modules 20a, 20b (for a detailed view of the design of the piezo fiber modules see FIG. 2). Additionally, further fiber Bragg grating sensors 30a are integrated into the structure 10 in a grid-shaped manner across the structure and are able to perform strain measurements therein as well as measure the propagation of elastic waves (Lamb waves). Due to the integration of individual fiber Bragg grating sensors 30 in the piezo fiber modules 20a, 20b, additionally the piezo fibers 22 can be checked for damage and their actual expansion. This allows the structure comprising a composite material and integrated piezo fiber modules as well as fiber Bragg grating sensors to be monitored as an entire system. Damage and fatigue processes can be detected both in the laminate and the piezo fiber modules.

For triggering of the piezo fiber modules, they are connected by means of a signal amplifier 40 with a function generator 41, which creates the required addressing sequences both for shape control/vibration dampening and for generating ultrasound waves with the frequencies necessary for strain measurement by means of the fiber Bragg grating sensors 30, 30a. The function generator 41 itself is controlled with a data line 41a by a process computer 60, which simultaneously also records, using the fiber Bragg grating sensors 30, 30a, the results of the strain measurements that are part of the ultrasound waves generated by the piezo fiber modules 20a, 20b.

To achieve this, light that is generated by a laser 50 is supplied via an optical line 50a and a first optical coupler 51 to the fiber Bragg grating sensors 30, 30a.

A small portion of the spectrum of the broadband light that is fed is reflected by each fiber Bragg grating sensor. The wavelength of the reflected light of each sensor is hereby proportional to its expansion.

The signals reflected by the fiber Bragg grating sensors 30, 30a are subsequently forwarded by a second optical coupler 52 via an optical line 53*a* to an optical detector 53, which performs the wavelength assignment. The result is then forwarded to the signals, which were generated for the piezo fiber modules 20*a*, 20*b*.

The change with regard to time of the fiber Bragg grating signals can be used for data interpretation and analysis purposes on the basis of a pattern recognition process.

FIG. 2 depicts a piezo fiber module 20*a*, 20*b* in enlarged view. Here the piezo-ceramic fibers 22 are embedded into a polymer 21. Between them, the fiber Bragg grating sensors 30 are arranged. For electrical contacting of the piezo-ceramic fibers 22 electrodes 23 are embedded in the polymer crosswise to the fibers in such a way that they contact the fibers 22 in sections. For respective polarity, electrical feed lines lead to the electrodes 23 out of the polymer in order to be able to connect to the function generator 41 and the signal amplifier 40. These piezo fiber modules 20*a* can be easily integrated in structures of composite design 10 since they have a similar design as the structure itself. This way the risk of introducing foreign bodies into the structure, which would lead to a delamination of the structure in this area, is very low.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A composite structure actuator and sensor system, comprising:

at least one piezo fiber module each including a plurality of fibers;

at least one fiber Bragg grating sensor wherein said at least one grating sensor is at least partially embedded in said at least one piezo fiber module, in order to provide for at least one of active vibration damping and shape control of said composite structure, wherein the piezo fiber modules are piezo-ceramic fibers that are embedded into a polymer and are arranged substantially parallel and wherein electrodes contact and run crosswise to the piezo-ceramic fibers.

2. The system that is integrated in a structure according to claim 1, further comprising at least one additional fiber Bragg grating sensor embedded in the composite structure.

3. The system according to claim 2, wherein the at least one additional fiber Bragg grating sensor are routed so as to form a grid.

4. The system according to claim 1, further comprising a function generator and a signal amplifier for triggering the at least one piezo fiber module.

5. The system according to claim 4, further comprising a control unit and a process computer for controlling a function generator and a signal amplifier.

6. The system according to claim 1, wherein triggering of the at least one fiber Bragg grating sensor is achieved by means of a laser, a second coupler, an optical detector and a process computer.

7. The system according to claim 1, wherein said composite structure is a carbon-fiber reinforced plastic structure.

8. The system according to claim 1, wherein each of said at least one fiber Bragg sensor is a strain measurement sensor.

* * * * *